April 8, 1952   G. A. CHADWICK ET AL   2,591,673
REVERSIBLE RATCHET TYPE PROJECTILE HOIST
Filed March 28, 1939   8 Sheets-Sheet 1
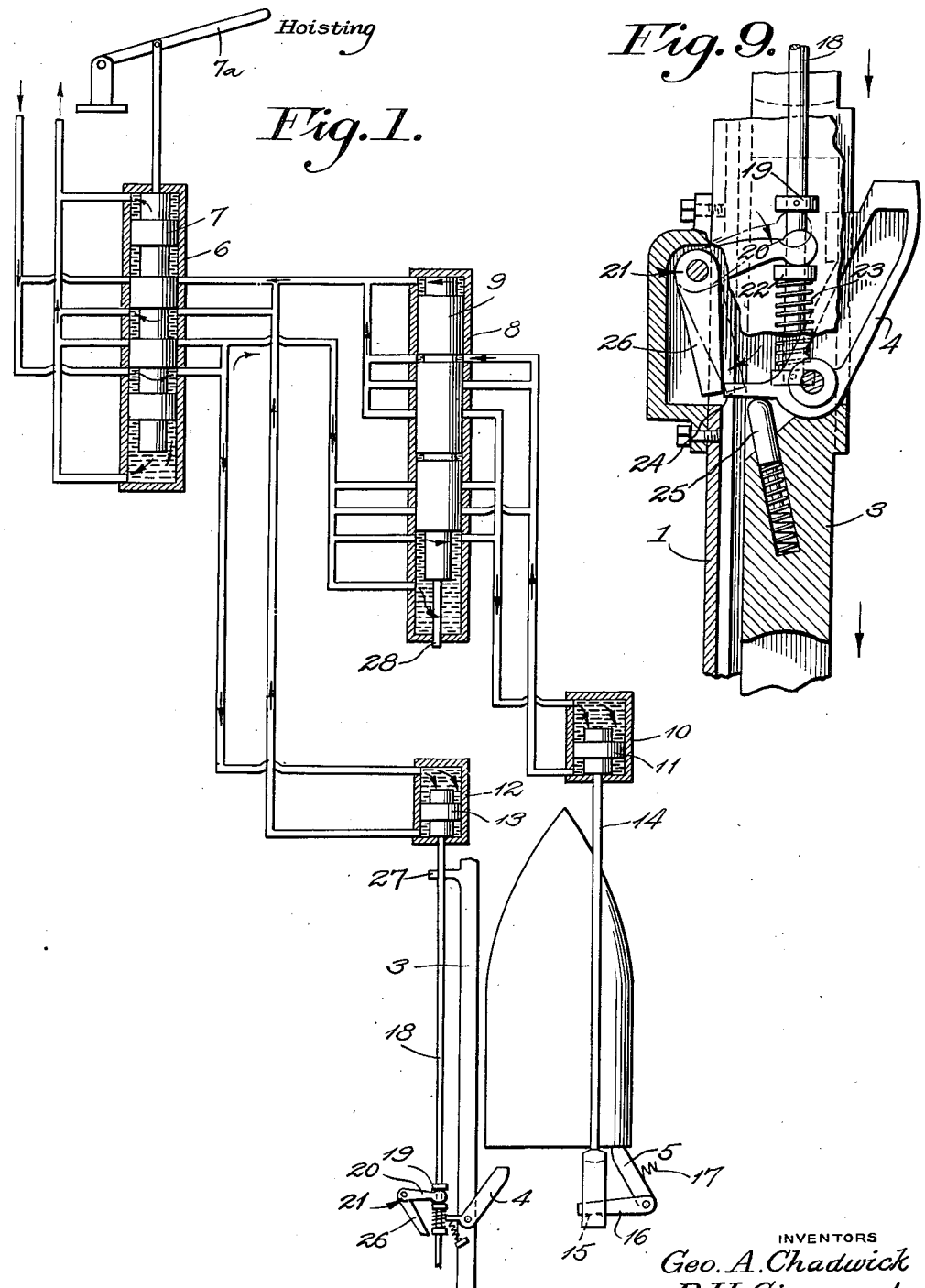
INVENTORS
Geo. A. Chadwick
P. H. Giroward
BY
Ransom K. Davis
ATTORNEY

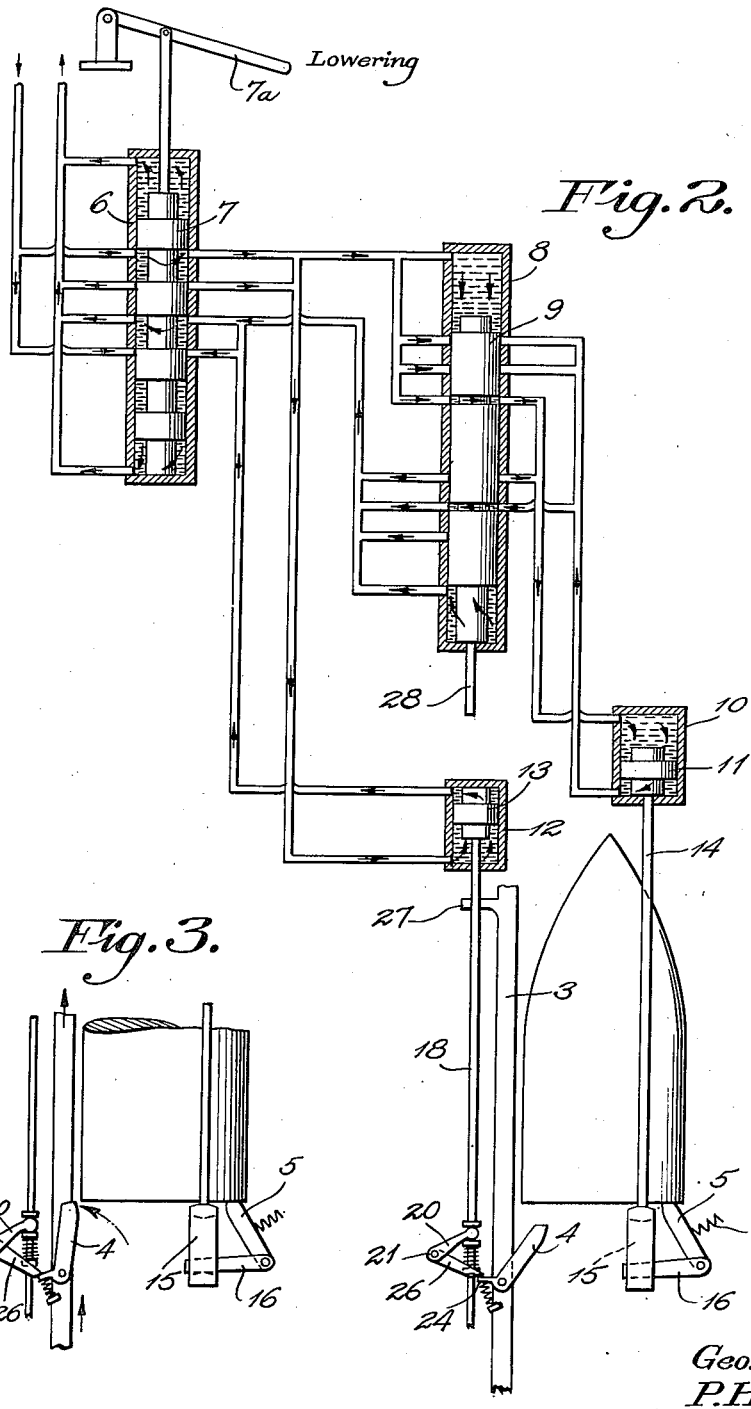

April 8, 1952     G. A. CHADWICK ET AL     2,591,673
REVERSIBLE RATCHET TYPE PROJECTILE HOIST
Filed March 28, 1939     8 Sheets-Sheet 3

INVENTORS
Geo. A. Chadwick
P. H. Girouard
BY
ATTORNEY

April 8, 1952   G. A. CHADWICK ET AL   2,591,673
REVERSIBLE RATCHET TYPE PROJECTILE HOIST
Filed March 28, 1939   8 Sheets-Sheet 4
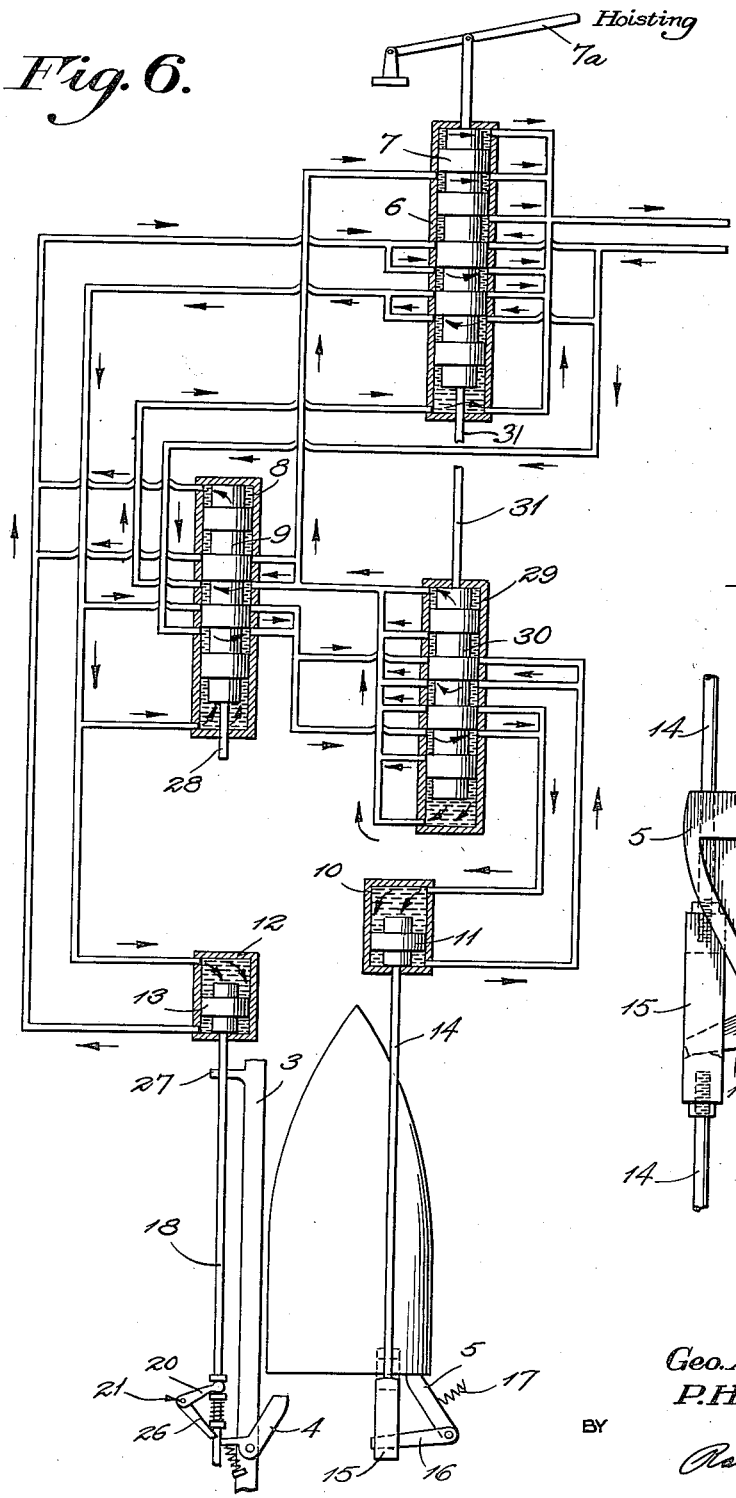
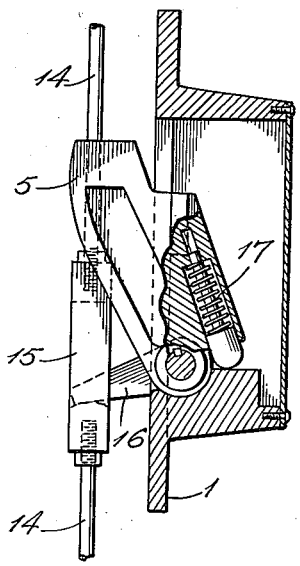
INVENTORS
Geo. A. Chadwick
P. H. Girouard
BY
Ramon K. Davis
ATTORNEY April 8, 1952 G. A. CHADWICK ET AL 2,591,673
REVERSIBLE RATCHET TYPE PROJECTILE HOIST
Filed March 28, 1939 8 Sheets-Sheet 5

INVENTORS
Geo. A. Chadwick
P. H. Girouard
BY
Ransom K. Davis
ATTORNEY

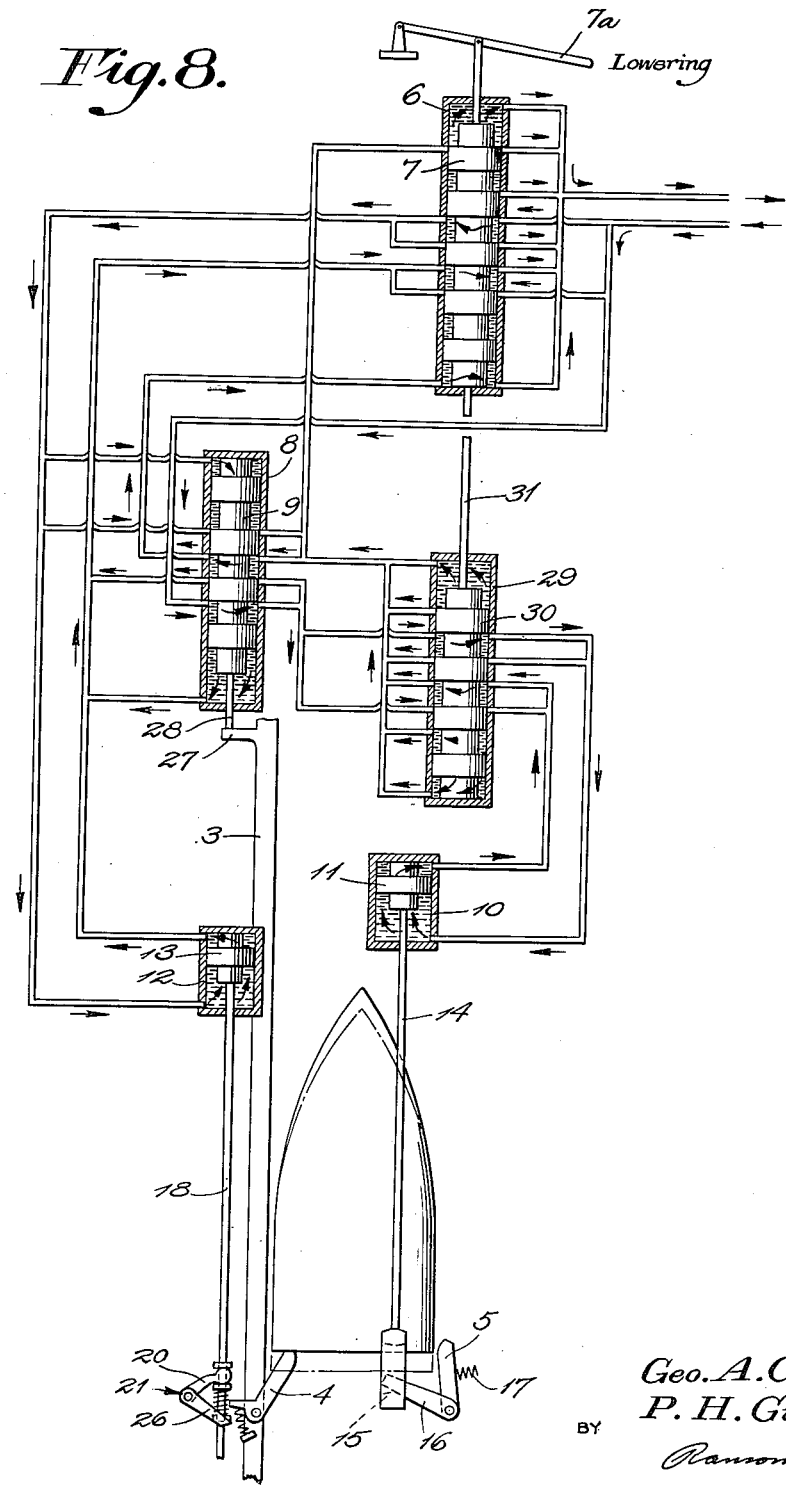

April 8, 1952     G. A. CHADWICK ET AL     2,591,673
REVERSIBLE RATCHET TYPE PROJECTILE HOIST
Filed March 28, 1939     8 Sheets-Sheet 7
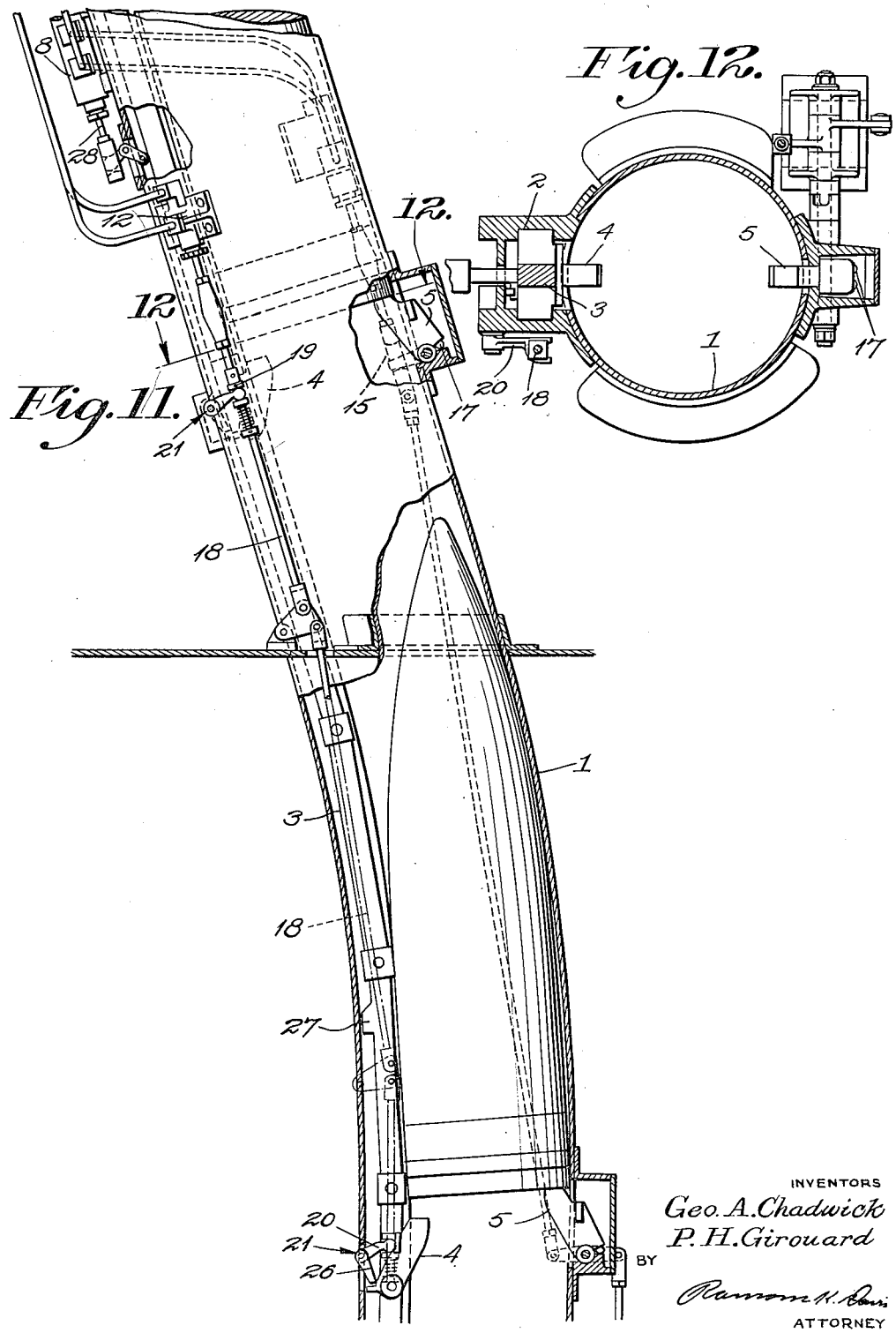
INVENTORS
Geo. A. Chadwick
P. H. Girouard
BY
ATTORNEY April 8, 1952   G. A. CHADWICK ET AL   2,591,673
REVERSIBLE RATCHET TYPE PROJECTILE HOIST
Filed March 28, 1939   8 Sheets-Sheet 8

INVENTORS
Geo. A. Chadwick
P. H. Girouard
BY
Ransom H. Davis
ATTORNEY

Patented Apr. 8, 1952

2,591,673

UNITED STATES PATENT OFFICE 2,591,673

REVERSIBLE RATCHET TYPE PROJECTILE HOIST

George A. Chadwick, Washington Grove, Md., and Philias H. Girouard, Washington, D. C.

Application March 28, 1939, Serial No. 264,624

7 Claims. (Cl. 198—225)

(Granted under the act of March 3, 1883, as amended April 30, 1928; 370 O. G. 757)

This invention relates to a projectile hoist of the ratchet type in which projectiles may be both raised and lowered by the same mechanism.

In previous hoists of this character no provision is made for lowering projectiles. The lack of some such means required the use of other means outside the hoist, usually a separate hoist, for this purpose. In armored gun emplacements, such for example, as turrets of naval vessels, only a small space is available for a large necessary mass of complicated machinery. The elimination of an extra hoist, as contemplated by this invention, will accomplish a great deal by reducing congestion, reducing the expense of equipment, installation and maintenance, and will mean a marked saving of weight on naval vessels, where weight is a matter of prime importance.

Referring now to the drawings:

Fig. 1 is a diagrammatic view of the hydraulic system of control used in a preferred embodiment of the invention, showing the parts in their projectile raising positions;

Fig. 2 is a view similar to Fig. 1 but showing the parts in their projectile lowering positions with the rack bar at the bottom of its stroke;

Fig. 3 is a detail view showing the operation of the pawls on upward movement of the rack bar from the position shown in Fig. 2, the operating lever being set for lowering projectiles;

Fig. 6 is a view similar to Fig. 1 but showing another embodiment of the hydraulic operating system, the mechanical elements of the hoist below cylinders 10 and 12 being identical with the construction shown in Figs. 1–5;

Fig. 8 is a view similar to Fig. 4 but showing the embodiment illustrated in Figs. 6 and 7;

Fig. 9 is an elevational view, partly in section, of the details of construction of the rack bar, pawl and pawl control rod of the device, the construction shown in this figure and in the following figures being usable with either of the hydraulic control system embodiments described herein;

Fig. 10 is an elevational view, partly in section, of one of the tube pawls and its control rod;

Fig. 11 is a side elevational view of a portion of the tube of a projectile hoist embodying the invention, with a part broken away to show a projectile therein and the pawls with their control means;

Fig. 12 is a view of a cross-section of the tube, taken at line 12—12 of Fig. 11;

Figure 13:
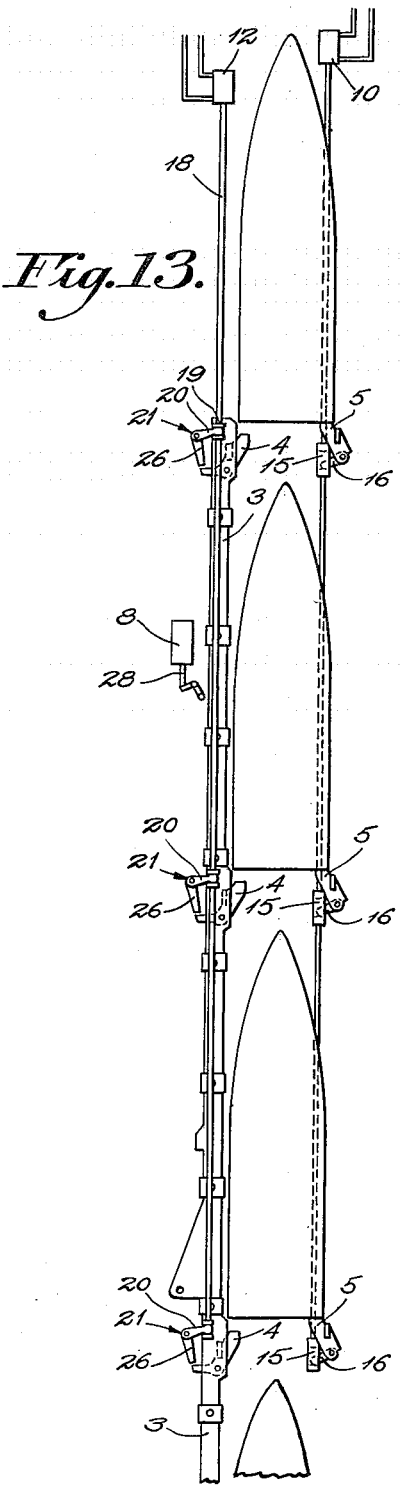
Fig. 13 is a diagrammatic view of a portion of the hoist carrying a series of projectiles.

The hoist comprises a trunk 1, as shown in Figs. 11 and 12, through which projectiles are hoisted and lowered. Housed in a channel guide 2, running parallel to the trunk and communicating therewith throughout its length is a rack-bar 3. Hoisting and lowering is accomplished by a reciprocating movement of the rack-bar. This movement is obtained by means of an hydraulic piston arrangement which is conventional in this type of hoist and is therefore not shown. The rack-bar carries pivoted pawls 4 at intervals therealong, which pawls project into the trunk and engage the bottoms of projectiles to be raised or lowered. Each pawl 4 has a toe 24 and each pawl is urged toward its extended projectile engaging position by a pair of spring pressed plungers 25. Located in recesses substantially opposite the rack-bar guide 2 are a plurality of trunk pawls 5, pivotally mounted in their recesses and likewise projecting into the trunk in the path of projectiles therein. The trunk pawls 5 are spaced at the same intervals as the rack-bar pawls, as shown in Fig. 13. The stroke of the rack-bar is slightly longer than the interval between trunk-pawls. At the bottom of the stroke each rack-bar pawl is slightly lower than one of the trunk-pawls. This distance is called the bottom over travel. At the top of the stroke the same rack-bar pawl will be slightly higher than the next upper trunk-pawl. This distance is called the top over travel.

Fig. 1 shows the hydraulic control system with its valves arranged in the proper positions for hoisting. The valve 6 is the means for controlling the direction of operation of the hoist and is here shown with its plunger 7 in the uppermost position. The plunger is controlled by the position of operating lever 7a. With the plunger 7 in the position shown the flow of fluid through the system is as indicated by the arrows. Fluid under pressure is admitted beneath the bottom of valve plunger 9 of valve 8 and above the plungers 11 and 13 of cylinders 10 and 12 respectively. Plunger 11 has attached to its bottom a rod 14 which has at its lower end a slotted portion 15. An arm 16 of the trunk-pawl 5 extends into this slot. Upward movement of plunger 11 will therefore raise arm 16 and remove pawl 5 from the pathway of a projectile in the trunk. The details of the structure of trunk-pawl 5 and its connection with the rod 14 are shown in Fig. 10. It will be noted that the pawl is biased toward the interior of the trunk by means of spring 17.

The plunger 13 of cylinder 12 has attached to its lower end a rod 18 which is operably connected to a plurality of similar rods 18 so that movement of the uppermost rod 18 is transmitted to all of the rods 18 as shown in Fig. 11. Spaced at intervals along the series of rods 18 are a plurality of identical pawl control assemblies, one of which is shown in Fig. 9 in detail. Each assembly includes a fixed collar 19 and a sliding collar 22 mounted on the rod 18, the sliding collar being urged upwardly by a spring 23. A bell crank lever 21 pivotally mounted on the fixed rack bar guide has a bifurcated arm 20 which extends around rod 18 between collars 19 and 22.

Figure 14:
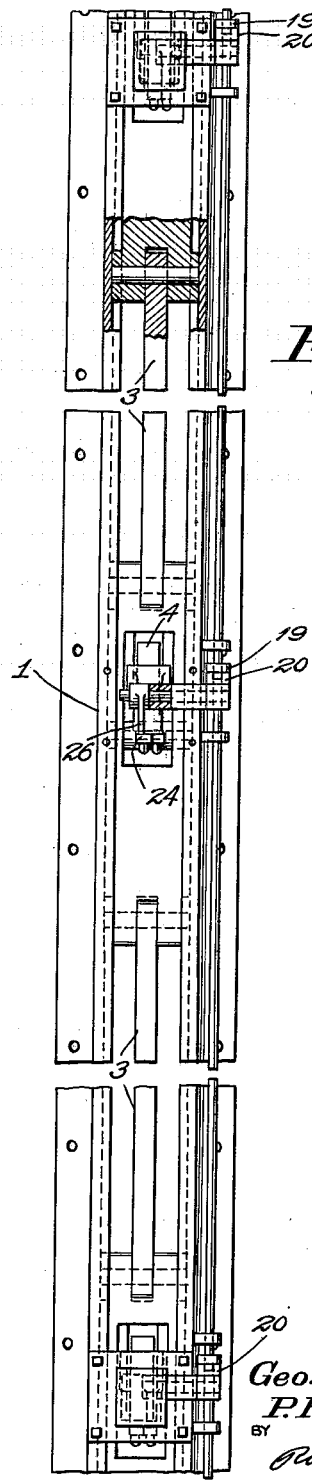
Fig. 14 is a diagrammatic showing of the rack-bar showing the arrangement of pawls therealong.

As will be noted in Fig. 14, the toe 24 and the bell-crank lever which acts on it are less than half the width of the rack-bar. The toe and its cooperating lever on adjacent pawls are located on opposite sides of the same face of the rack-bar, as shown in Fig. 14, so that each rack-bar pawl will be acted upon only by the lower one of the two bell-crank levers which will be encountered by it in its reciprocatory motion.

When the hydraulic control system is regulated for hoisting, as shown in Fig. 1, neither the rod 14 nor the rod 18 have any effect on the pawls. With a projectile resting on the trunk-pawl 5 the rack-bar with its pawl 4 starts the upward portion of its reciprocatory motion from the position of rest shown in Fig. 1. As the pawl 4 moves up it engages the projectile and carries it up past the next higher trunk-pawl 5. The projectile in passing this pawl forces it into its housed position in its recess. As the bottom of the projectile passes the pawl the latter is forced out into the trunk by its spring 17. The rack-bar then begins its downward stroke depositing the projectile upon the trunk-pawl. During the downward stroke the rack-bar pawl engages the ogive of the projectile resting on the next lower trunk pawl and is forced into its housed position until it passes the bottom of the projectile, whereupon it is snapped out into its extended position by its spring-pressed plunger 25. It now is again at the bottom of the rack-bar stroke, as shown in Fig. 1. As this cycle is repeated, each upstroke of the rack-bar carries the whole series of projectiles in the hoist upward a distance equal to one interval between adjacent trunk-pawls.

In Fig. 2 the hydraulic control system is shown with its valves set for lowering. The lever 7a is in its downward position. With this setting the plunger 7 of valve 6 allows fluid flow in the system as shown by the arrows. Fluid under pressure is admitted above the plungers 9 and 11 of valve 8 and cylinder 10 and below plunger 13 of cylinder 12.

At the beginning of the upstroke of the rack-bar the end of the lower arm 26 of each bell-crank lever 21 overlaps the toe 24 of its corresponding rack-bar pawl 4, as shown in Fig. 2. As the upstroke proceeds the pawl 4 is turned into its housed position (see Fig. 3) and held there by the arm 26 until the top of the pawl has passed the bottom of the projectile carried by the adjacent trunk-pawl. The arm 26 then slides off the end of toe 24. As soon as the pawl has been moved past the cylindrical portion of the projectile it is gradually forced out into extended position by its spring-pressed plunger 25. When the rack-bar nears the top of its upstroke each rack-bar pawl encounters the bottom of a projectile and lifts it off the trunk-pawl which had been supporting it. As soon as this takes place a lug 27 on the upper end of the rack-bar encounters the lower end of rod 28 extending downward from plunger 9 of valve 8 and lifts the plunger to the position shown in Fig. 4. For purposes of simplification, Figs. 1, 2, 4, 6, 7, and 8 show a lug 27 for contacting rod 28. In actual practice, the lug 27 comprises a cam extending outwardly from the rack bar as shown in Figs. 11 and 13, and operates rod 28 through a pivoted linkage 28a also shown in Figs. 11 and 13. The upward movement of rod 28 alters the flow of liquid to cylinder 10, as shown by the arrows, and lifts the plunger 11 of that valve. The slotted portions 15 of rod 14 attached to this plunger at the same time lift the pawls 5 out of the way of the projectiles in the hoist.

Figure 4:
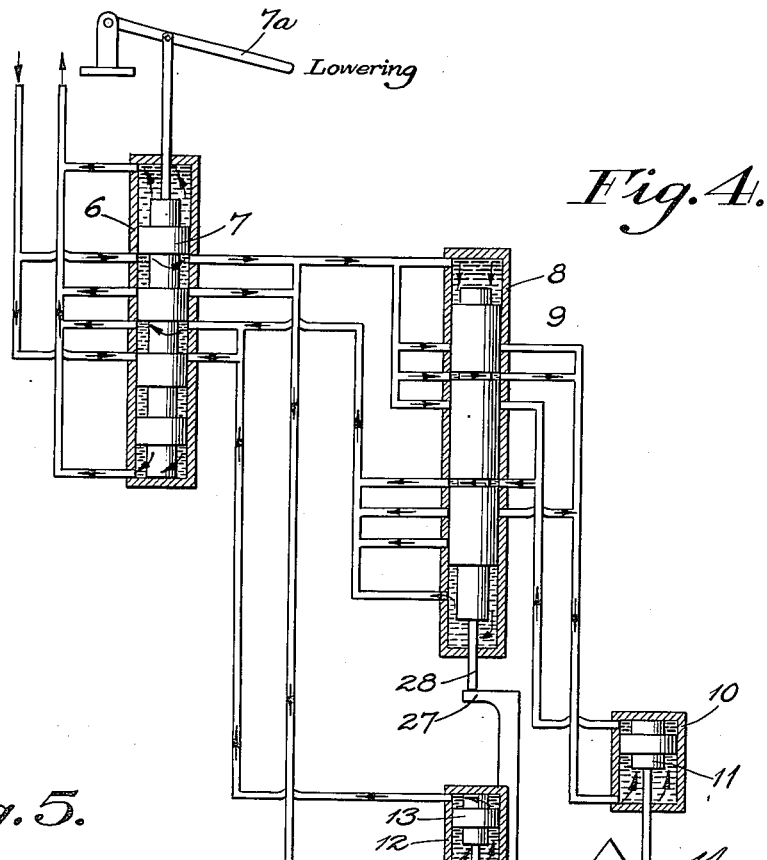
Fig. 4 is a view similar to Fig. 2 but showing the rack bar at the top of its stroke.
Figure 5:
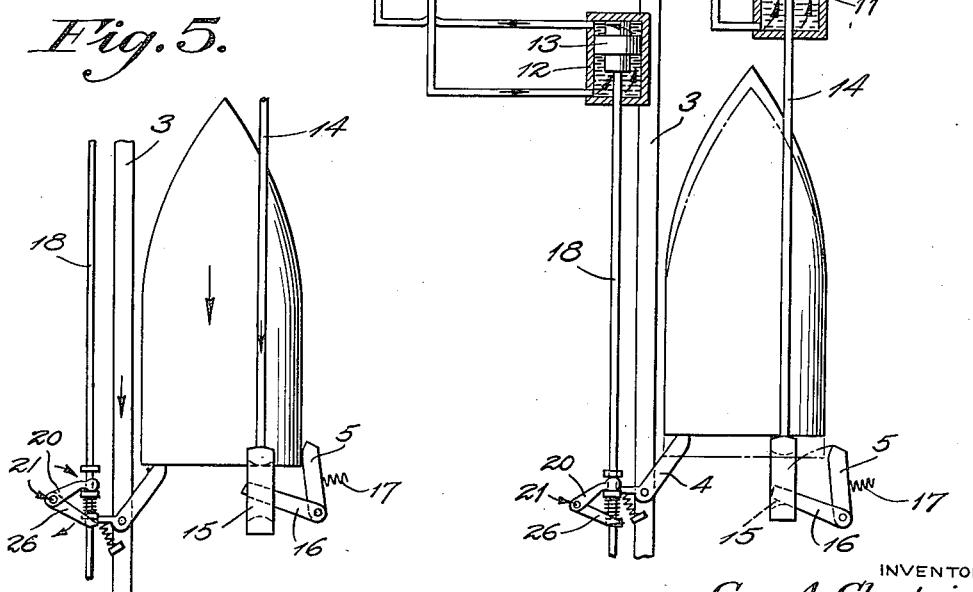
Fig. 5 is a view similar to Fig. 3 but taken just after the rack bar has begun its downward movement.

The rack-bar is now in its uppermost position and as it starts down the projectiles are lowered with it, carried on rack-bar pawls 4 (see Fig. 5). At the same time the plunger 11 is lowered due to removal of lug 27 from rod 28, which permits the pressure of fluid above plunger 9 to move the plunger 9 to its lower position, but by this time the bottom of each projectile has passed the adjacent trunk-pawl and maintains it housed, as shown in Fig. 5, until the diminishing diameter of the passing projectile allows it again to be forced by its spring into extended position. Near the bottom of the rack-bar stroke each projectile is deposited on a trunk-pawl and the cycle begins again.

Figure 7:
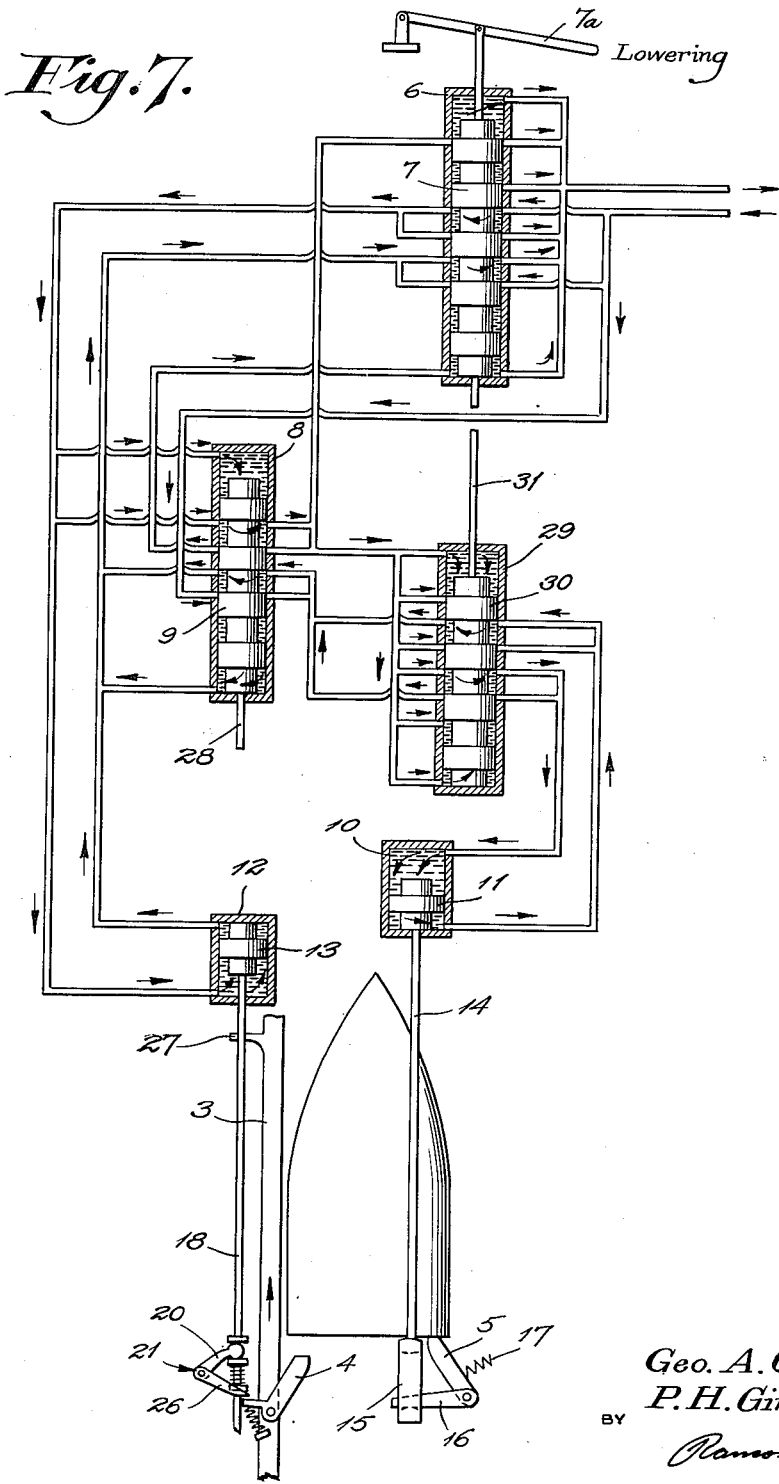
Fig. 7 is a view similar to Fig. 2 but showing the embodiment illustrated in Fig. 6.

Figs. 6, 7 and 8 disclose a modification of the apparatus described above. The operation of the hoist is the same as before. However, the arrangement of the fluid operating system is somewhat different, employing an extra valve 29, the plunger 30 of which is connected to the plunger 7 of valve 6 by a rod 31. The positions of the valve plungers and the direction of flow of fluid in the system for hoisting and lowering is clearly shown in these figures. The fluid operating or pawl control system is susceptible of endless modification, the two forms shown here being merely illustrative of two typical systems which have proven satisfactory for the purpose. Obviously, mechanical pawl control systems coordinated with the movements of the rack-bar could be used in place of the fluid system.

It is to be understood that the invention is not to be restricted by the details of the foregoing disclosure but only by the scope and limitations of the accompanying claims.

The invention described herein may be manufactured and/or used by or for the Government of the United States of America for governmental purposes without the payment of any royalties thereon or therefor.

We claim:

1. A hoist for raising and lowering projectiles or other articles, said hoist comprising a trunk for the passage of projectiles therethrough, a series of equally spaced pivoted pawls secured thereto, a reciprocating rack-bar carrying pivoted pawls spaced at intervals equal to those between said trunk pawls, whereby reciprocation of said rack-bar will cause each of said rack-bar pawls to pick up a projectile at the bottom of the stroke, elevate it through one interval during the upstroke and then deposit it on one of the trunk pawls while said rack-bar descends past said projectile on the downstroke, and fluid controlled means coordinated with the movements of said rack-bar and actuatable at will to move each of said rack-bar pawls out of the path of said projectiles during the first part of the upstroke of said rack-bar and to move each of said trunk pawls out of the path of said projectile during the first part of the downstroke of said rack-bar, whereby said hoist may be operated to lower projectiles.

2. In a projectile hoist of the type having a trunk for passage of projectiles therethrough, a series of equally spaced pivoted pawls attached thereto, a reciprocating rack-bar and a series of pivoted pawls carried thereby, said pawls being equally spaced apart at intervals equal to those between said trunk pawls; means adapting said hoist for the lowering of projectiles, said means comprising a fluid system, a first plunger in said system, means connected to said plunger which when said plunger is in a certain position will trip each of said rack-bar pawls out of the path of projectiles in said trunk during the initial part of the upstroke of said rack-bar, a second plunger in said system, means connected to said second plunger which when said plunger is in a certain position will trip said trunk pawls out of the path of projectiles in said trunk, means in said system actuated by the movement of said rack-bar through the latter part of its upstroke to move said second plunger into said position and means in said system operable at will to move said first plunger into an inoperative position and to render said second plunger moving means inoperable by said rack-bar.

3. In a device of the class described, a rack-bar, a series of projectile supporting pawls carried thereby and equally spaced therealong, said rack-bar being arranged for reciprocating movement in the direction of its length, the amplitude of said movement being at least as great as the interval between said pawls, each of said pawls having a toe extending therefrom, said toes being staggered with respect to the center line of said rack-bar, a series of tripping means extending parallel to said series of pawls, said means being spaced at the same intervals and staggered in the same manner as said pawls, and so located with respect to said rack-bar that each of said pawls will pass by two of said means during one stroke of said rack-bar, and said tripping means being movable as a unit either into or out of tripping relation to said pawls, whereby when said tripping means are moved into tripping relation, the movement of said rack-bar will cause each of said pawls to be tripped out of projectile supporting position during a portion of a rack-bar stroke in passing one of said tripping means but to be unaffected in passing the other of said means.

4. In a device of the class described, a rack-bar, a series of projectile supporting pawls carried thereby, a series of pawl tripping means operable to render said pawls incapable of supporting projectiles, said rack-bar being arranged for reciprocating movement in the direction of its length, said series of pawl tripping means being so located that each of said pawls will pass by two of said means during each stroke of said rack-bar, the coacting portions of said means and pawls being so positioned that only one of the two means passed by each pawl will coact to trip it and means for withdrawing said series of tripping means from tripping relation with said pawls.

5. In a projector hoist having a trunk for the passage of ammunition therethrough, a series of equally spaced pivoted pawls attached thereto, a reciprocating rack-bar and a series of pivoted pawls carried thereby, said pawls being equally spaced apart at intervals equal to those between said trunk pawls; means for reciprocating said rack bar so that its pawls cover strokes which overlap the intervals between the trunk pawls opposite them, fluid operated withdrawing means for the trunk pawls, fluid operated tripping means for the rack bar pawls to trip them to an inoperative position as they pass opposite the corresponding trunk pawl near the bottom of their stroke, and control means for said fluid operated means.

6. The combination of claim 5 in which said controlling means comprise a fluid pressure responsive control valve for said withdrawing means having upper, lower and intermediate control positions, a control lever having a "hoisting" and a "lowering" position connected to a valve for simultaneously controlling said tripping means and said fluid pressure responsive control valve to keep said withdrawing means inoperative in either position of the lever and the corresponding upper or lower position of the control valve while rendering said tripping means operative only in the "lowering" position of the lever, a lug on the rack bar for raising the control valve to its intermediate position at the top of the rack bar stroke to render the withdrawing means operative when the lever is in the "lowering" position.

7. The combination of claim 5 in which said controlling means comprise a fluid pressure responsive control valve and having upper and lower positions for rendering said withdrawing means inoperative and an intermediate position for rendering said means operative, a fluid control valve connected to a hoist control lever having an upper "hoisting" and a lower "lowering" position, fluid supply and exhaust means connected to passages in the valve so as to render both the tripping means inoperative and hold the fluid pressure responsive control valve in its upper position when the lever is in its "hoisting" position, and to render the tripping means operative and hold the fluid pressure responsive control valve in its lower position when the lever is in its "lowering" position, and means on the rack bar for manually moving the fluid pressure responsive control valve to its intermediate position at the top of the stroke of the rack bar, when the lever is in its "lowering" position.

GEORGE A. CHADWICK.
PHILIAS H. GIROUARD.

REFERENCES CITED

The following references are of record in the file of this patent:

UNITED STATES PATENTS

| Number | Name | Date |
| --- | --- | --- |
| 236,485 | Conner | Jan. 11, 1881 |
| 624,826 | Krone | May 9, 1899 |
| 722,894 | Potter | Mar. 17, 1903 |
| 1,158,272 | Peteler | Oct. 26, 1915 |
| 1,183,841 | Adell | May 23, 1916 |
| 1,484,659 | Lee | Feb. 26, 1924 |
| 1,554,830 | Webster | Sept. 22, 1925 |
| 1,602,961 | Beilharz | Oct. 12, 1926 |